Figure 1:
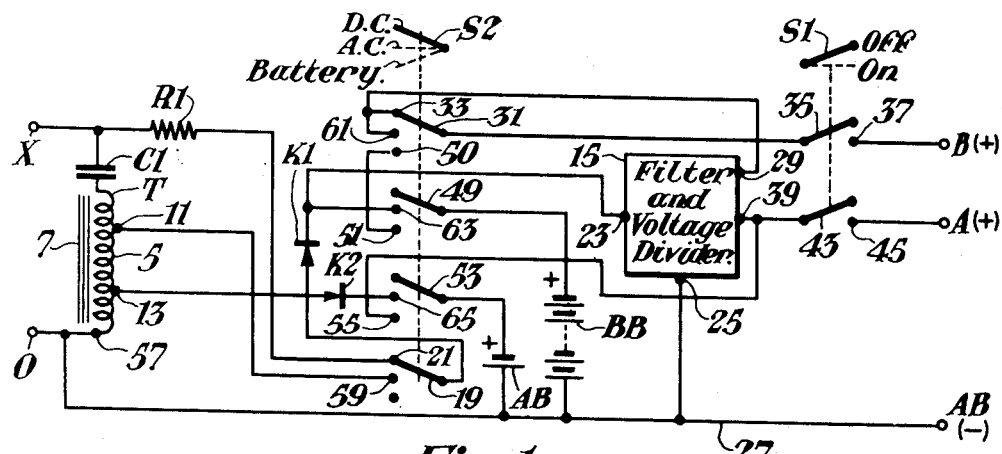

April 11, 1950

A. J. SORENSEN 2,503,774

POWER SUPPLY MEANS

Filed April 27, 1948

INVENTOR.
Andrew J. Sorensen.
BY
HIS ATTORNEY

Patented Apr. 11, 1950

2,503,774

UNITED STATES PATENT OFFICE 2,503,774

POWER SUPPLY MEANS

Andrew J. Sorensen, Edgewood, Pa., assignor to The Union Switch & Signal Company, Swissvale, Pa., a corporation of Pennsylvania Application April 27, 1948, Serial No. 23,460

4 Claims. (Cl. 321—2)

My invention relates to power supply means, and particularly to power supply means for charging primary batteries or storage batteries of the type employed in portable radio units.

The chemical action which takes place in a dry cell when energy is supplied thereto is not fully understood, and in this disclosure, the term charging when applied to a dry cell battery will be understood to mean the restoration of the battery to or near its initial condition by passing current through the battery in the reverse direction. Also, the term normal voltage of a battery is here used to mean the voltage of the battery at its initial condition or slightly above that value as found necessary to bring the battery to its fully charged or reconditioned state.

It has heretofore been proposed to provide portable radio receivers with apparatus arranged so that the receiver may operate from self-contained batteries, from a source of direct current, or from an available source of alternating current by the use of rectifiers. The batteries used in such arrangements may be of the dry cell type and it has been proposed to recharge them but this process requires careful regulation of the charging current, since an over-charge or an excessive charging current will ruin the battery.

Accordingly, it is an object of this invention to provide power supply means which may be employed in portable radio units and the like for charging primary or storage batteries associated with such a unit.

Another object of my invention is to provide a direct current power supply means for a portable radio unit which may be selectively employed to operate the unit and charge the battery associated with the unit from a source of alternating current or to operate the unit from a source of direct current.

A further object of my invention is to provide a direct current power supply for a portable radio receiver which may be employed to operate the receiver and simultaneously charge the batteries associated with the receiver.

Another object of my invention is to provide a power supply means for charging dry cell batteries and wherewith the charge is automatically regulated to prevent over-charging the batteries.

Another object of this invention is to provide an improved type of power supply means.

Other objects of my invention and features of novelty will be apparent from the following description taken in connection with the accompanying drawings.

In practicing my invention I provide rectifiers of the dry disc type which may be supplied with alternating current energy from an auto-transformer which is arranged with a condenser to operate in the ferro-resonant region and which is proportioned and arranged so that the output voltage is held substantially constant, or the apparatus may be supplied with energy directly from a direct current source under certain conditions. By appropriate switching means, the direct current energy supplied from the rectifiers is supplied either directly to an associated load, such as, for example, a radio receiver through appropriate filtering circuits or to the primary or storage batteries associated with the load. Additionally, the switching means provides for the connection of the batteries directly to the load for operation thereof.

I shall describe two forms of power supply means embodying my invention and shall then point out the novel features thereof in claims.

Figure 2:
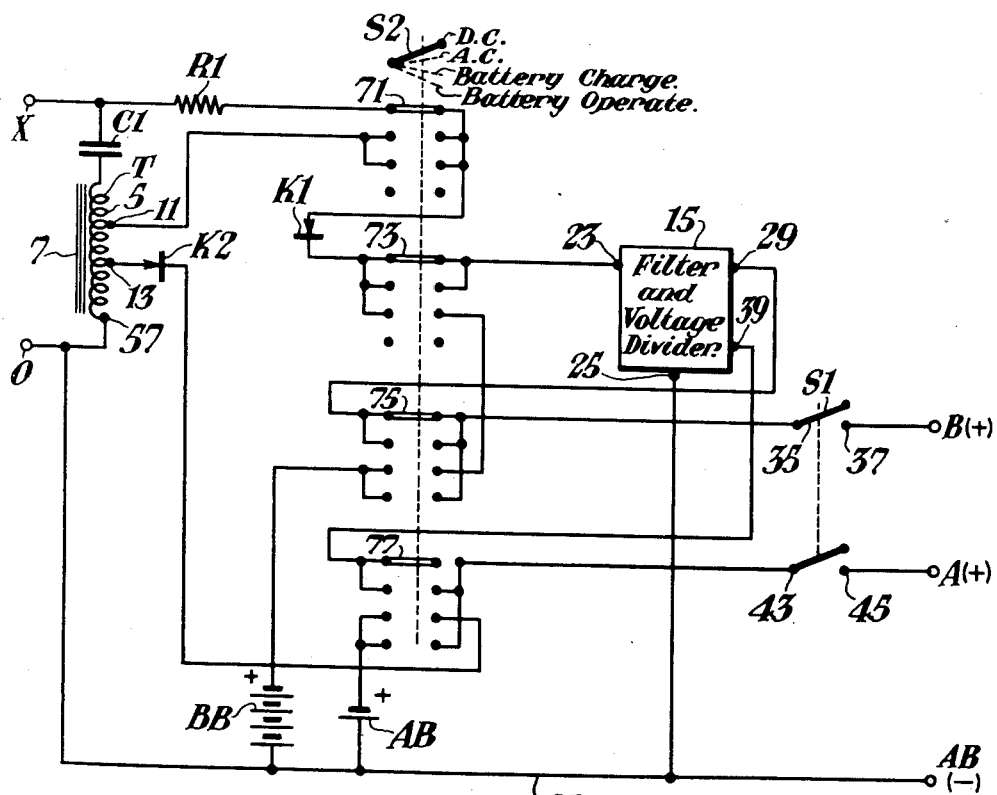

In the drawings, Figs. 1 and 2 are diagrammatic views showing two forms of power supply means embodying my invention when used with a portable radio receiver.

Similar reference characters refer to similar parts in each of the two views.

Referring to Fig. 1, an auto-transformer T has a winding 5 mounted on an iron core structure 7 of suitable type, and the winding 5 is provided with taps 11 and 13 so that when alternating current is supplied to the winding 5, suitable voltages may be obtained by the connection of circuits to these taps. A condenser C1 is connected in series with the winding 5 and the condenser and auto-transformer are connected across a pair of terminals X and O. The condenser C1 and auto-transformer T are proportioned and arranged so that the combination is operated beyond its ferro-resonant point. Such an arrangement is characterized by the fact that as the voltage of the alternating current energy supplied to the combination is increased from zero value, the voltage across the transformer winding remains low until the supply voltage reaches a definite value, say, for example, 70 volts for a 110 volt transformer. At this point, if the supply voltage is increased by a small amount, the voltage across the winding of the transformer will increase by a factor between 5 and 10. After this sudden increase, if the supply voltage is reduced, the voltage across the transformer will remain at its high value, until the supply voltage is reduced beyond a second critical point, at which the voltage across the winding of the transformer will suddenly decrease to a low value. This characteristic is sometimes designated the "jumping phenomena in ferro-resonance." Such arrangements are well-known in the art, and one article on such arrangements is that of P. H. Odessey and Ernst Weber, titled "Critical conditions of ferro-resonance," appearing in the August 1938 issue of Electrical Engineering.

The condenser C1 and transformer T are arranged and proportioned so that when alternating current energy of suitable voltage, say, for example, 110 volts, is supplied to the terminals X and O, the voltage will be such that the combination will operate beyond the ferro-resonant point, and as a result, after the supply voltage is initially applied, the voltage across the winding 5 will remain substantially constant despite variations thereafter in the supply voltage.

The taps 11 and 13 of the winding 5 are arranged to supply voltages of suitable value to circuits subsequently described.

Dry disc rectifiers K1 and K2 act as half wave rectifiers to rectify alternating current energy supplied thereto. Two switches S1 and S2 are provided for connecting the circuits in various combinations, and reference character 15 designates a filter and voltage divider such as are usually provided in power supplies for radio receivers for filtering the direct current supplied to the receiver and to provide proper voltages for operation of the various elements of the receiver.

In accordance with usual practice, the reference characters B(+), A(+) and AB(—) designate the positive high voltage terminal, the positive low voltage terminal, and the common terminal, respectively, of the circuits of the radio receiver, not shown, for which the apparatus shown forms the power supply means. The batteries AB and BB are low and high voltage batteries suitable to power the radio receiver and which batteries may be either of the primary or storage type, and preferably are of the dry cell type.

In describing the operation of the apparatus of Fig. 1, it will be assumed that it is desired to operate the radio receiver from a source of direct current. Accordingly, a direct current source is connected to terminals X and O. Switch S1, which controls the supply of power to the radio receiver, is placed on its "on" position, and switch S2 is placed in the position shown and designated by the reference character DC.

When direct current from a suitable source is supplied to the input terminals X and O, so that terminal X is positive with respect to terminal O, energy is supplied to the filter and voltage divider 15 by a circuit which is traced from terminal X, through a current limiting resistor R1, over movable contact 19 and stationary contact 21 of switch S2, through rectifier K1 to the input terminal 23 of filter 15. From an output terminal 29 of filter and voltage divider 15, energy is supplied to the high voltage terminal B(+) of the radio receiver by a circuit including movable contact 31 and stationary contact 33 of switch S2, and movable contact 35 and stationary contact 37 of switch S1. Additionally, energy is supplied from the output terminal 39 of filter 15 over movable contact 43 and stationary contact 45 of switch S1 to the low voltage terminal A(+) of the radio receiver. The various parts of the filter and voltage divider 15 are arranged and proportioned to drop the voltage to the value required for the low voltage circuits of the radio receiver. A return circuit for the energy supplied to the radio receiver is established by the common connection 27 which connects the common return terminal AB(—) to the common terminal 25 of the filter and voltage divider 15, and to terminal O.

From the foregoing, it will be seen that at this time, direct current energy supplied to the terminals X and O is supplied at the proper voltages to the circuits of the radio receiver. Due to the presence of condenser C1, the direct current is unable to flow through the winding 5 of transformer T, so that no energy is wasted thereby.

It will now be assumed that it is desired to operate the radio receiver from energy supplied from the batteries AB and BB. Accordingly, switch S2 is operated to its lowermost position, designated by the reference character Battery. In this position, high voltage energy is supplied from the battery BB to the radio receiver by a circuit which is traced from the positive terminal of battery BB over movable contacts 31 and 49 and stationary contacts 50 and 51 of switch S2, and over movable contact 35 and stationary contact 37 of switch S1 to terminal B(+). Low voltage energy is supplied from the battery AB to the radio receiver by a circuit which is traced from the positive terminal of battery AB, over movable contact 53 and stationary contact 55 of switch S2, and over movable contact 43 and stationary contact 45 of switch S1 to terminal A(+). The common return terminal AB(—) is connected to the negative terminals of batteries AB and BB by the common connection 27.

Accordingly, it will be seen that at this time, the radio receiver will be energized by direct current supplied directly from the batteries AB and BB.

It will now be assumed that it is desired to operate the radio receiver from an available source of alternating current energy and simultaneously charge the batteries associated therewith. Accordingly, the switch S2 is operated to its middle position, designated by the reference character AC, and the terminals X and O are connected to the source of alternating current energy.

As previously explained, when alternating current of suitable value is supplied to the combination comprising the condenser C1 and the transformer T, the combination is thereafter operated beyond its ferro-resonant point, so that subsequent changes in the supply voltage do not cause variation of the voltage across the winding 5. Accordingly, the alternating current energy supplied from the taps on winding 5 of transformer T will be substantially free of voltage variations due to fluctuations of the voltage of the energy supplied to the input terminals X and O, and as a result, a substantially constant voltage of suitable value may be obtained from the taps 11 and 13 of winding 5 with a common connection to the lower terminal 57 of transformer winding 5. At this time energy is supplied to the radio receiver by a circuit which is traced from tap 11 of winding 5, over movable contact 19 and stationary contact 59 of switch S2, through rectifier K1, through filter and voltage divider 15, over movable contact 31 and stationary contact 61 of switch S2, and over movable contact 35 and stationary contact 37 of switch S1 to terminal B(+) of the radio receiver. Additionally, energy from the output terminal 39 of filter 15 is supplied over movable contact 43 and stationary contact 45 of switch S1 to terminal A(+) of the radio receiver. The common return terminal AB(—) is connected by the common connection 27 to the terminal 57 of transformer T, and to the common terminal 25 of filter 15. Accordingly, the radio receiver is supplied with filtered direct current energy having the proper values for operation of the receiver.

At this time, energy is also supplied to the batteries AB and BB to recharge the batteries to their normal voltage. Energy is supplied to battery BB by a circuit which is traced from tap 11 of winding 5, over movable contact 19 and stationary contact 59 of switch S2, through the half-wave rectifier K1, over movable contact 49 and stationary contact 63 of switch S2 to the positive terminal of battery BB, with the negative terminal of battery BB connected to terminal 57 of winding 5 by the common connection 27. Energy is supplied to battery AB by a circuit which is traced from tap 13 of winding 5, through the half-wave rectifier K2, and over movable contact 53 and stationary contact 65 of switch S2 to the positive terminal of battery AB, with the negative terminal of battery AB connected to terminal 57 of winding 5 by the common connection 27.

As previously explained, the alternating current energy supplied from the taps on winding 5 is substantially free of voltage variation and the parts are proportioned and arranged so that the voltage applied across the batteries for charging the batteries is substantially equal in each case to the initial or normal voltage of the batteries. For example, if the battery BB is a dry battery having an initial or normal voltage of 90 volts when it is new, the voltage applied to this battery for recharging it is substantially 90 volts. Thus when the battery is recharged after it has become partially exhausted due to having been used to operate the radio receiver, and the voltage of the battery is brought back toward its normal value, the charging voltage never exceeds the normal voltage with the result that when the voltage of the battery reaches its normal value there will be an equality between the battery voltage and the charging voltage and approximately no charging current flows through the battery. That is, the charging is terminated when the battery is brought back to its initial or normal voltage.

Accordingly, it will be seen that my invention provides for supplying energy having a constant voltage for charging the batteries, so that when the voltage of the battery rises to its fully charged normal value, the charging current is diminished to substantially zero.

Referring now to Fig. 2, the apparatus is similar in construction and operation to that shown in Fig. 1, except that the switch S2 is arranged to provide four types of operation, that is, operation of the radio receiver from direct current, operation of the receiver from alternating current, operating the radio receiver from the batteries, and charging the batteries from alternating current, and it is deemed sufficient to explain the manner in which the circuits are switched to produce the conditions recited above.

For purposes of description, the positions of the switch from the topmost position to the lowermost position will be designated as first, second, third, and fourth positions, respectively.

If it is assumed that the radio receiver is to be operated from a direct current source connected to terminals X and O, the switch S2 is operated to its first position designated by the reference character DC, and the switch S1 is placed in its "on" position. Energy is now supplied to the input terminal 23 of the filter and voltage divider 15 by a circuit which is traced from terminal X, through resistor R1, over contact 71 of switch S2 in its first position, through rectifier K1, and over contact 73 of switch S2 in its first position to the input terminal 23 of the filter and voltage divider 15. From the output terminal 29 of the filter and voltage divider 15, energy is supplied to the high voltage terminal B(+) of the radio receiver by a circuit including contact 75 of switch S2 in its first position and contacts 35 and 37 of switch S1. Additionally, energy is supplied from the output terminal 39 of the filter and voltage divider 15 to the low voltage terminal A(+) of the radio receiver by a circuit including contact 77 of switch S2 closed in its first position and contacts 43 and 45 of switch S1. A return circuit for the energy supplied to the radio receiver is established by the common connection 27 which connects the common return terminal AB(−), the common terminal 25 of the filter and voltage divider 15, and terminal O.

From the foregoing, it will be seen that at this time, direct current energy supplied to the terminals X and O is supplied at the proper voltages to the circuits of the radio receiver. As in Fig. 1, the direct current does not flow through the winding 5 of transformer T due to the presence of condenser C1.

It will now be assumed that it is desired to operate the radio receiver from an available source of alternating current energy connected to the terminals X and O, and accordingly the switch S2 is placed in its second position, designated by the reference character AC. As previously explained in connection with Fig. 1, the voltage of the energy supplied from the taps 11 and 13 of winding 5 are maintained relatively constant, despite fluctuations of the voltage supplied to terminals X and O. At this time energy is supplied to terminal B(+) by a circuit which is traced from tap 11 of winding 5, over contact 71 of switch S2 in its second position, through rectifier K1, over contact 73 of switch S2 in its second position to the input terminal 23 of the filter and voltage divider 15, and from the output terminal 29 over contact 75 of switch S2 in its second position and contacts 35 and 37 of switch S1 to terminal B(+). Additionally, low voltage energy is supplied to terminal A(+) by the circuit traced from output terminal 39 of the filter and voltage divider 15 over contact 77 of switch S2 in its second position and contacts 43 and 45 of switch S1 to terminal A(+). A return path for the energy is provided by the common connection between the terminal AB(−), terminal 57 of the winding 5, and the common connection 25 of the filter and voltage divider 15. Accordingly, the radio receiver is supplied with filtered direct current energy having the proper values for operation of the receiver.

With a source of alternating current energy connected to terminals X and O, the batteries BB and AB may be charged by placing switch S2 in its third position, designated Battery charge. Half wave rectified direct current is then supplied to battery BB by the circuit which is traced from tap 11 of winding 5, over contact 71 of switch S2 in its third position, through rectifier K1, and over contacts 73 and 75 of switch S2 in their third position, to the positive terminal of battery BB, the negative terminal of battery BB being connected to terminal 57 of winding 5 by the common connection 27. Half wave rectified energy is supplied to battery AB at this time by a circuit which is traced from tap 13 of winding 5, through rectifier K2, and over contact 77 of switch S2 in its third position to the positive terminal of battery AB, the negative terminal of battery AB being connected to terminal 57 of winding 5 by the common connection 27. As explained previously in connection with Fig. 1, the voltage of the energy supplied to the batteries is maintained relatively constant at a voltage equal to or slightly above the normal voltage of the batteries, so that when the batteries become fully charged, the charging current is reduced to approximately zero. That is, the charging is terminated when the batteries are brought back to their initial or normal voltage.

If it is desired to operate the radio receiver directly from the batteries, the switch S2 is placed in its fourth or lowermost position designated Battery operate. At this time, the positive terminal of battery BB is connected to terminal B(+) by a circuit including contact 75 of switch S2 in its fourth position, and contacts 35 and 37 of switch S1. The positive terminal of battery AB is connected to terminal A(+) by a circuit including contact 77 of switch S2 in its fourth position and contacts 43 and 45 of switch S1. The common return terminal AB(—) is connected to the negative terminals of batteries AB and BB by the common connection 27. Accordingly, it will be seen that, at this time, the radio receiver will be energized by direct current supplied directly from batteries AB and BB.

It is to be understood that my invention is not limited to its use in portable radio receivers and that this one application illustrates one of the many places in which power supply means embodying my invention is useful.

Although I have herein shown and described only two forms of power supply means embodying my invention, it is to be understood that various changes and modifications may be made therein within the scope of the appended claims without departing from the spirit and scope of my invention.

Having thus described my invention, what I claim is:

1. In a power supply means, in combination, a pair of input terminals to which an alternating current source of a given normal voltage may be connected at times and to which a direct current source of a given normal voltage may be connected at other times, a ferro-resonant combination comprising a transformer and a condenser in series connected across said input terminals, said ferro-resonant combination being operated beyond the ferro-resonant point when said alternating current source is connected to said terminals and blocking the flow of current therethrough when said direct current source is connected to said terminals, a load circuit requiring a given operating direct voltage, a rectifier, a multiple position switch, and a circuit network including said rectifier and said switch to selectively connect said load circuit, transformer and input terminals to supply said given operating direct voltage to said load circuit from either said alternating current source through said transformer and said rectifier, or said direct current source.

2. In a power supply means, in combination, a pair of input terminals to which alternating current energy of a predetermined minimum value may be supplied at times and to which direct current energy may be supplied at other times, a ferro-resonant combination comprising an auto-transformer and a condenser connected in series across said terminals, said ferro-resonant combination being arranged and proportioned so that the voltage across said auto-transformer remains substantially constant when alternating current energy having said predetermined minimum value is supplied to said input terminals, a rectifier, a load circuit, and switching means for at times connecting said load circuit through said rectifier to said auto-transformer, and at other times for connecting said load circuit to said input terminals through said rectifier.

3. In a power supply means, in combination, a pair of input terminals to which alternating current energy may be supplied at times and to which direct current energy may be supplied at other times, an auto-transformer having a tapped winding, a condenser, said auto-transformer winding and said condenser being connected in series across said input terminals, and proportioned and arranged so that when alternating current energy having a voltage in a preselected range is supplied to said input terminals said transformer and said condenser form a ferro-resonant combination operating beyond the ferro-resonance point, whereby the voltage across said winding remains substantially constant despite fluctuations of the alternating current supply voltage within said preselected range, a rectifier, a load circuit, and switching means for at said times connecting said load circuit to a selected tap on said auto-transformer through said rectifier so that the energy supplied thereby to said load circuit does not exceed said predetermined normal voltage, said switching means being effective at said other times for connecting said load circuit to the input terminals through said rectifier independently of said condenser.

4. In a power supply means, a pair of input terminals to which a source of alternating current may be connected, a condenser, a transformer, said condenser and a winding of said transformer in series connected across said input terminals, said condenser and transformer arranged to form a ferro-resonant combination operating at its ferro-resonant point when supplied with said alternating current at a predetermined minimum voltage, a load circuit requiring a given normal voltage and characterized by being adversely affected when subjected to a voltage above its normal voltage, a rectifier, and circuit means including said rectifier to connect said load circuit to a winding of said transformer, said winding being selected to supply a voltage not exceeding said normal voltage irrespective of voltage fluctuations of said source.

ANDREW J. SORENSEN.

REFERENCES CITED

The following references are of record in the file of this patent:

UNITED STATES PATENTS

| Number | Name | Date |
|---|---|---|
| Re. 20,317 | Suits | Mar. 30, 1937 |
| 1,627,815 | Wibler | May 10, 1927 |
| 1,934,692 | Bellamy | Nov. 14, 1933 |
| 2,000,571 | Oswald | May 7, 1935 |
| 2,195,969 | Miner | Apr. 2, 1940 |
| 2,222,196 | Vilkomerson | Nov. 19, 1940 |
| 2,337,987 | Galloway | Dec. 28, 1943 |
| 2,346,997 | Priest | Apr. 18, 1944 |
| 2,423,114 | Potter | July 1, 1947 |
| 2,453,960 | Avidsson | Nov. 16, 1948 |

FOREIGN PATENTS

| Number | Country | Date |
|---|---|---|
| 617,336 | Germany | Aug. 16, 1935 |
| 793,186 | France | Nov. 16, 1935 |

OTHER REFERENCES

Radiocraft pp. 51–54 July, 1941, 320–4.